United States Patent
Böhnke

(10) Patent No.: US 9,776,109 B2
(45) Date of Patent: Oct. 3, 2017

(54) METHOD FOR FILTERING A SUSPENSION AND RECESS PLATE

(75) Inventor: Bernd Böhnke, Eschweiler (DE)

(73) Assignee: OUTOTEC (FINLAND) OY, Espoo (FI)

( * ) Notice: Subject to any disclaimer, the term of this patent is extended or adjusted under 35 U.S.C. 154(b) by 0 days.

(21) Appl. No.: 14/394,495

(22) PCT Filed: Apr. 19, 2012

(86) PCT No.: PCT/EP2012/057186
§ 371 (c)(1),
(2), (4) Date: Oct. 15, 2014

(87) PCT Pub. No.: WO2013/156070
PCT Pub. Date: Oct. 24, 2013

(65) Prior Publication Data
US 2015/0114914 A1    Apr. 30, 2015

(51) Int. Cl.
*B01D 25/164* (2006.01)
*B01D 25/28* (2006.01)
*B01D 25/21* (2006.01)

(52) U.S. Cl.
CPC ......... *B01D 25/164* (2013.01); *B01D 25/215* (2013.01); *B01D 25/281* (2013.01); *B01D 25/284* (2013.01)

(58) Field of Classification Search
CPC combination set(s) only.
See application file for complete search history.

(56) References Cited

U.S. PATENT DOCUMENTS 1,342,839 A * 6/1920 Atkins ................... B01D 25/12
210/225
1,441,445 A    1/1923 Naugle
(Continued)

FOREIGN PATENT DOCUMENTS

FR    1363465    5/1963
JP    2005131508    5/2005
(Continued)

OTHER PUBLICATIONS

International Preliminary Report on Patentability for related PCT Application No. PCT/EP2012/057186, issued Oct. 21, 2014, 6 pgs.
(Continued)

*Primary Examiner* — Krishnan S Menon
*Assistant Examiner* — Ryan B Huang
(74) *Attorney, Agent, or Firm* — Von Rohrscheidt Patents

(57) ABSTRACT

The invention relates to a method for filtering a suspension in a filter device comprising a sequence of steps, including piping the suspension into the filter chamber between the filter cloths, directing the suspension through the filter cloths, discharging a liquid fraction of the suspension through the first duct and the second duct out of the filter chamber and through the first outlet of the first recess plate and the second outlet of the second recess plate as a filtrate, and piping a drying gas from the head piece into the filter chamber through the first duct and discharging the same through the second duct. The invention further relates to such a recess plate that is designed for packing a plurality of specimens of the recess plate into a pack between a stationary head piece and a moveable end piece of a filter device.

14 Claims, 4 Drawing Sheets

(56) References Cited

U.S. PATENT DOCUMENTS

Figure 1A:
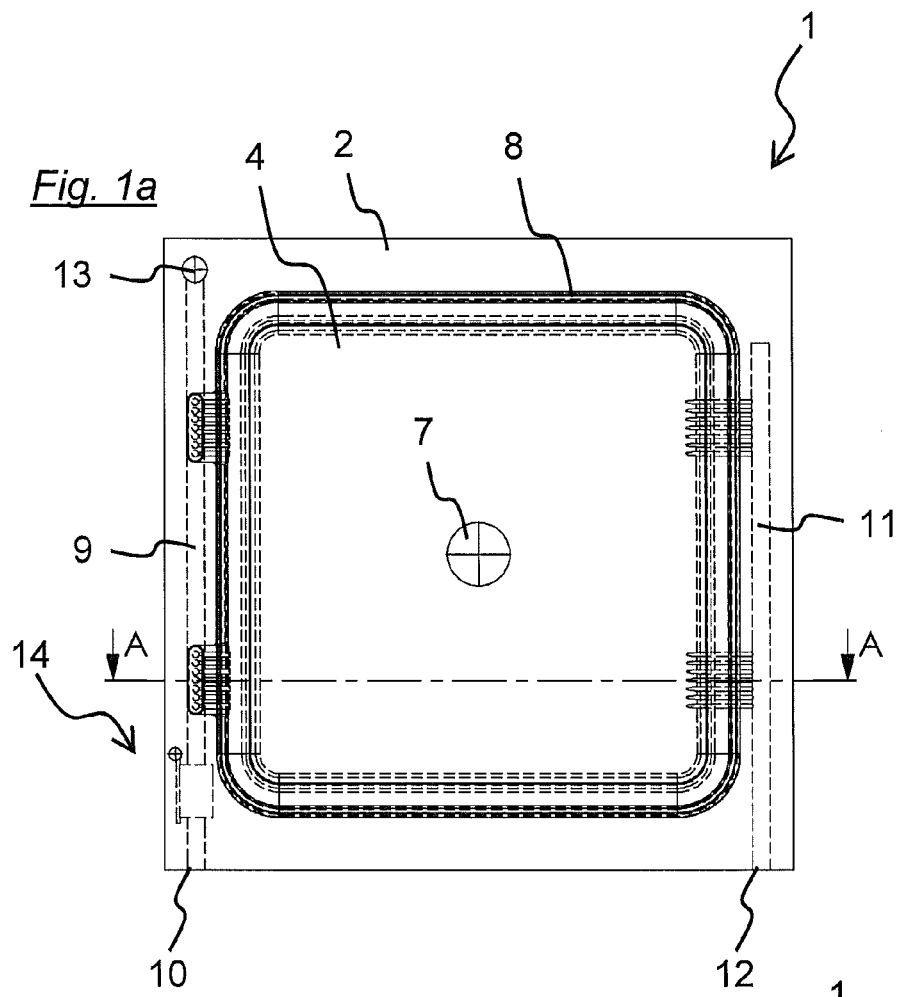

| | | | |
|---|---|---|---|
| 3,289,845 A | 12/1966 | Weber | |
| 6,180,002 B1 * | 1/2001 | Higgins | 210/185 |
| 2006/0032805 A1 * | 2/2006 | Hildebrant | B01D 25/21 |
| | | | 210/228 |
| 2007/0170382 A1 * | 7/2007 | Li | F16K 31/122 |
| | | | 251/5 |

FOREIGN PATENT DOCUMENTS

| | | |
|---|---|---|
| JP | 2006223946 | 8/2006 |
| JP | 2006247465 | 9/2006 |
| WO | 02/09842 A1 | 2/2002 |
| WO | WO 0209842 A1 * | 2/2002 |
| WO | WO 2010117288 A1 * | 10/2010 |

OTHER PUBLICATIONS

English abstract of WO2002/009842, published Feb. 7, 2002, www.patentscope.wipo.int, 2 pgs.

* cited by examiner

METHOD FOR FILTERING A SUSPENSION AND RECESS PLATE

TECHNICAL FIELD

The invention relates in general to filtering and in particular to a method for filtering a suspension in a filter device and to a recess plate.

BACKGROUND ART

In press filter devices and the like, a filter chamber is formed between two adjacent recess plates by the recess of at least one of the recess plates. Filtrate is discharged from the filter chamber through outlets into two separate filtrate collecting ducts, leading back to a head piece of the filter device. A Drying gas is piped from the head piece through one of these filtrate collecting ducts and outlets into the filter chamber and discharged through the other duct and filtrate collecting duct back to the head piece.

The drying gas is under pressure when piped into the filter chamber, and pushes the remaining liquid through a filter cake formed on a filter media in the filter chamber. After permeating the cake, the drying gas pressure falls down to ambient pressure and the drying gas expands, accordingly. For piping the expanded drying gas from the filter chamber back to the head piece, the related filtrate collecting duct either requires significantly larger pipes than the duct that pipes the pressurized drying gas from the head piece to the filter chambers, or the expanded drying gas flows at a significantly higher speed. In the former case, the related pipe cross section is unavailable for the filter chamber and thus decreases filtration capacity of the filter device. In the latter case, the increased speed of gas flow causes erosion and wearing of the recess plate.

Recess plates according to prior art have filtrate taps for manually opening the filtrate ducts to the ambience, for testing purposes, during a filtration cycle. Comparing opacity of the filtrate protruding from the taps provides for a simple but however qualitatively sensitive visual performance check of the related filter cloths. Moreover, in some filter devices according to prior art filtrate is always disposed straight from the filter chambers through the base body of the respective recess plates, to the ambience. However, such filter devices do not provide for drying the filter cake.

Problem to be Solved

Thus it is an object of the invention to increase filtration capacity of the known methods, recess plates and filter devices.

SUMMARY OF INVENTION

The invention suggests a method for filtering a suspension in a filter device, the filter device having between a stationary head piece and a movable end piece a pack of at least a first recess plate having a first recess and/or a second recess plate having a second recess, the first recess and/or the second recess forming a filter chamber between the first recess plate and the second recess plate, and the filter device having two filter cloths between the first recess plate and the second recess plate for filtering a solid content out of the suspension as a filter cake, and the first recess plate having a first duct towards a first outlet and the second recess plate having a second duct towards a second outlet, the method comprising a sequence of steps, including piping the suspension into the filter chamber between the filter cloths, directing the suspension through the filter cloths, such that the filter cake settles between the filter cloths, discharging a liquid fraction of the suspension through the first duct and the second duct out of the filter chamber and through the first outlet of the first recess plate and the second outlet of the second recess plate as a filtrate, and piping a drying gas from the head piece into the filter chamber through the first duct and discharging the same through the second duct, and to discharge the drying gas straight from the second duct to the ambience. A method according to the invention avoids the need for a collecting duct for the expanded drying gas. In a filter device executing such method, the pipe cross section that was in the state of the art provided for the expanded drying gas, is available for other purpose, in particular for enlarging the filtration chamber, and thus the filtration capacity.

Preferably, within a method according to the invention, the filtrate is discharged through the first and second ducts straight to the ambience, and the first duct is closed to the ambience prior to piping the drying gas into the filter chamber. Such method according to the invention further avoids the need for filtrate collecting ducts. In a filter device executing such method, the pipe cross section that was in the state of the art provided for collecting the filtrate, is available for other purpose, in particular for enlarging the filtration chamber, and thus the filtration capacity. However, such filter device must provide means for piping the drying gas to the first ducts.

Alternatively, a method according to the invention may be executed on a filter device piping the filtrate back to the head piece, in particular where the filtrate must be prevented from pollution. For executing such method according to the invention, the recess plates have valves opening the second duct to the ambience, for the expanded drying gas. In the related filter device, the pipe cross section of the filtrate collecting ducts only has to be sufficient for the filtrate, that protrudes from the filter chambers.

Further preferred, within a method according to the invention, prior to the drying gas, a remaining liquid is mechanically pressed out of the filter cake by filling a squeezing fluid into a squeezing chamber between a movable membrane and the first recess plate. Making use of such movable membranes for pressing the filter cake is commonly known in the state of the art.

In an advantageous method according to the invention, prior to the drying gas, a washing liquid is piped from the head piece into the filter chamber through the first duct and discharged through the second duct. Making use of washing liquid for cleaning the filter cake is commonly known in the state of the art. The washing liquid may be piped to the first ducts and/or disposed through the second ducts using the same means that are provided for the drying gas, in the related filter device.

The invention further suggests a recess plate, that is designed for packing a plurality of specimens of the recess plate into a pack between a stationary head piece and a movable end piece of a filter device, wherein the recess plate has a first recess and/or an adjacent recess plate in the filter device has a second recess, the first recess and/or the second recess forming a filter chamber between the recess plate and the adjacent recess plate, wherein the filter device has two filter cloths between the recess plate and the adjacent recess plate for filtering a solid content out of a suspension as a filter cake, and wherein the recess plate has a duct for discharging a liquid fraction of the suspension out of the filter chamber as a filtrate, and a valve for opening the duct to the ambience, and wherein a valve for opening the second duct to the ambience is nested in the recess plate. A recess plate according to the invention allows for executing the above mentioned method according to the invention and is equally characterized by the advantages mentioned above. Recess plates according to the invention are made of plastics, e.g. polypropylene (PP), or of metal, e.g. aluminium or steel.

Preferably, a recess plate according to the invention has a control conduit for the valve. The valve may be operated by a pressurized fluid, in particular air, water or hydraulic oil. Alternatively, the valve may be electrically operated.

Further preferred, such recess plate has a through-hole, connected to the control conduit, wherein in a filter device, the through-holes of the specimens of the recess plate form a control pipe to the head piece. Operating the valves thus requires no external duct.

In an advantageous embodiment of a recess plate according to the invention, the valve is a pneumatically driven membrane, preferably a pinch valve. A pneumatically driven membrane, in particular a pinch valve provides for a very simple and thus cheap valve type. The valve may be provided in a cartridge for easy replacement in case of failure.

Preferably, a recess plate according to the invention has a movable membrane sealed around the filter chamber, wherein the membrane and the recess plate enclose a squeezing chamber and the recess plate has an inlet duct for filling a squeezing fluid into the squeezing chamber, for mechanically pressing a remaining fluid out of the filter cake. Making use of such movable membranes for pressing the filter cake is commonly known in the state of the art.

Such a recess plate according to the invention may have a second movable membrane at a face opposite to the filter chamber, wherein the movable membrane is sealed around a second filter chamber, wherein the second membrane and the second recess plate enclose a second squeezing chamber and the recess plate has a second inlet duct for inserting a squeezing fluid into the second squeezing chamber. Such symmetrical recess plates (named "membrane plates") are commonly known in the state of the art to be used alternating with other symmetrical recess plates, having no membranes (named "chamber plates"), in a pack of recess plates in a filter device.

Further according to the invention a filter device is suggested to have at least one recess plate having the features mentioned above, in particular to have a pack of recess plates, each having two movable membranes, as mentioned above, and other recess plates alternating in the pack (named "mix pack").

Alternatively, a recess plate according to the invention may have two adjacent filter chambers, but only one face with a membrane. Such recess plates (named "combi plates") are commonly known in the state of the art to be used in sequence, in a pack of recess plates (named "combi pack") in a filter device.

In a filter device according to the invention, the recess plates of the pack are vertically stacked on top of each other or hanging side by side. The filter device is secured by hydraulic force, by the weight of the stacked recess plates and/or by mechanical means.

In a filter device according to the invention, the filter chamber may be formed by two adjacent recesses, or by one single recess adjoining to a face of a recess plate with no recess. Furthermore, the pack may contain a sequence of identical recess plates in unchanging orientation, a sequence of identical recess plates in changing orientation or a sequence of alternating recess plates. Accordingly, recess plates may have two recesses, one recess or even no recess at all.

BEST MODE FOR CARRYING OUT THE INVENTION

The method according to the invention and the associated recess plate and filter device are subsequently described in more detail with reference to preferred embodiments illustrated in the drawing figures.

Figure 1B:
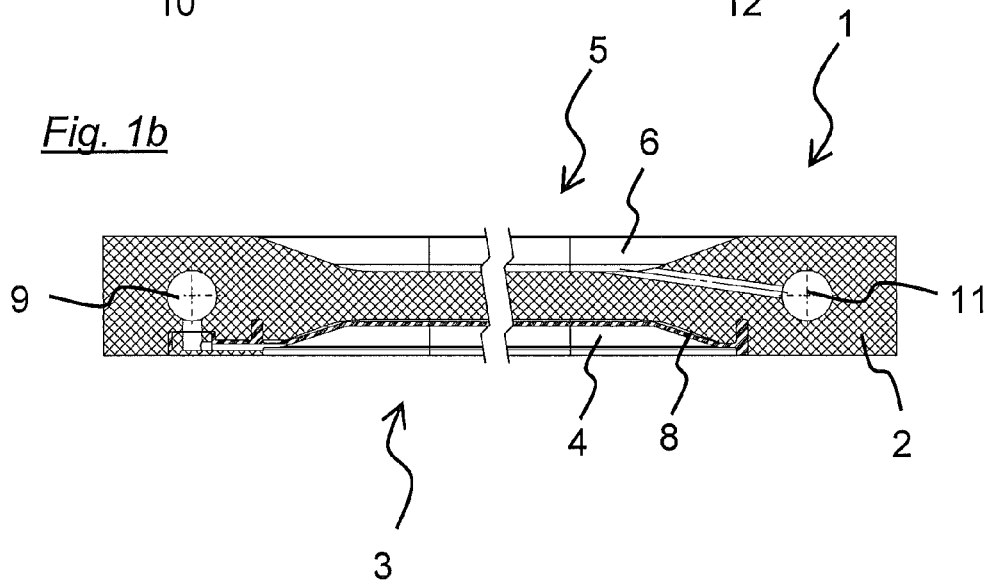
Figure 1C:
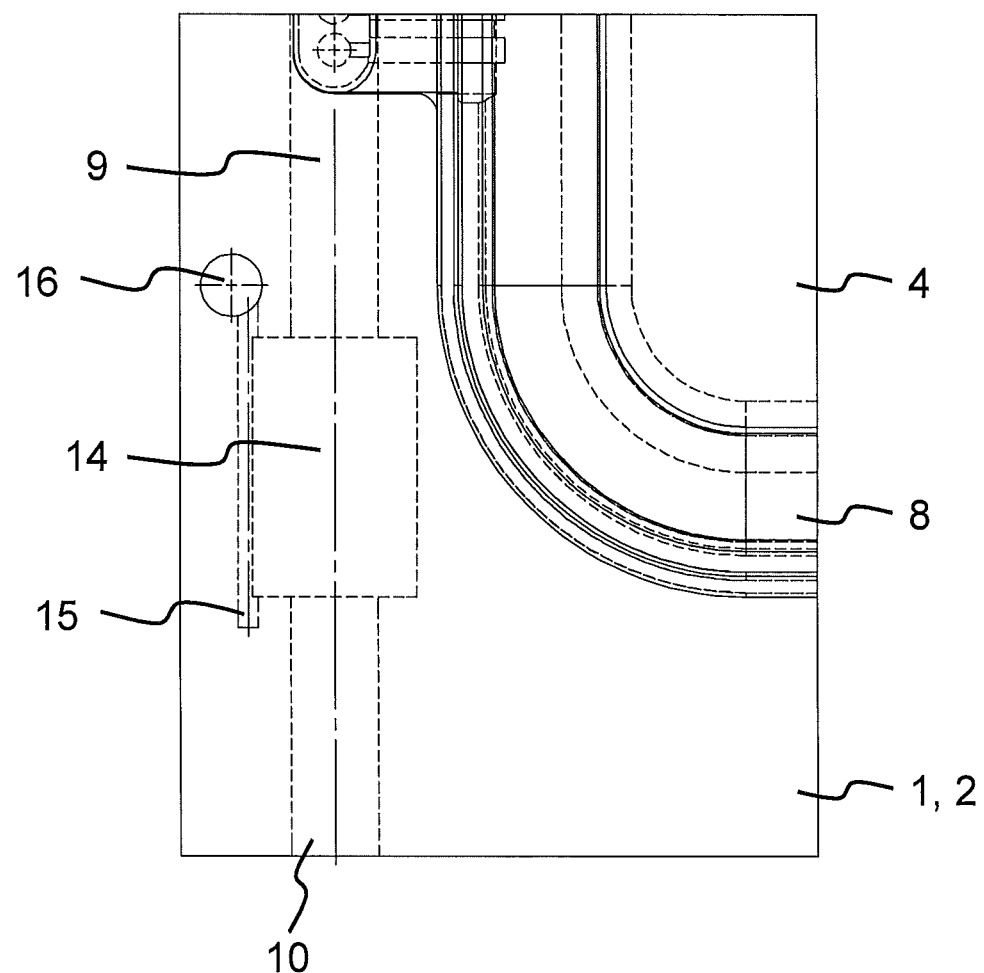
Figure 2A:
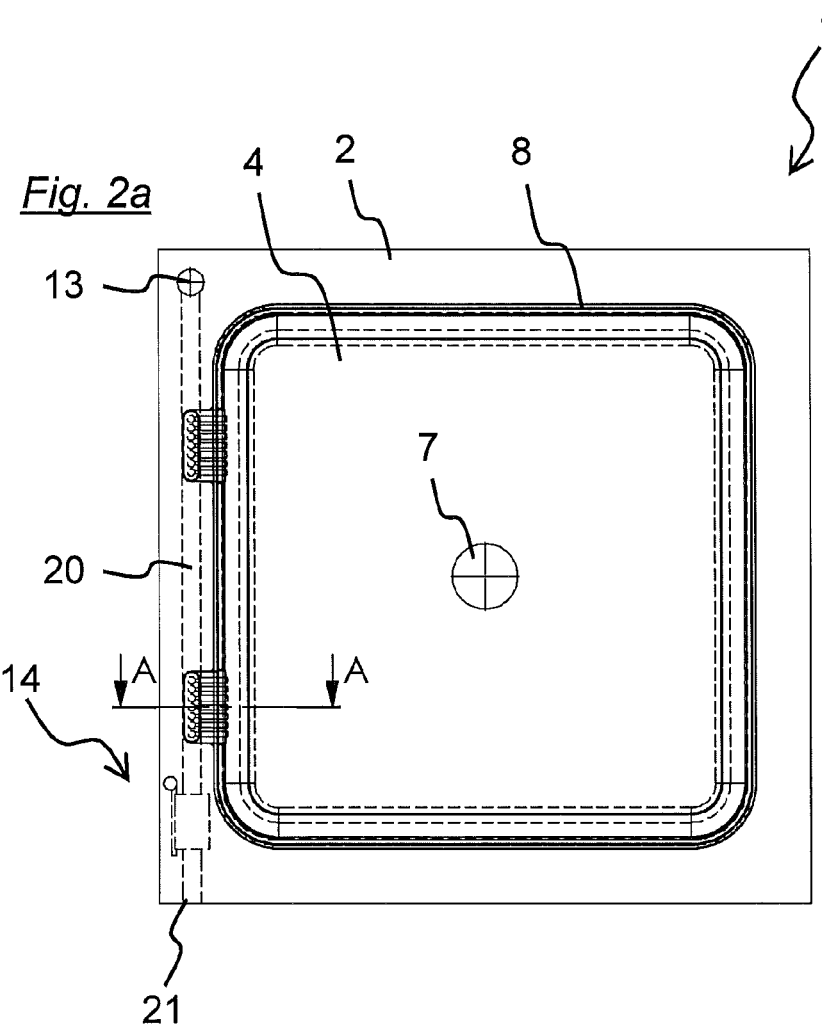
Figure 2B:
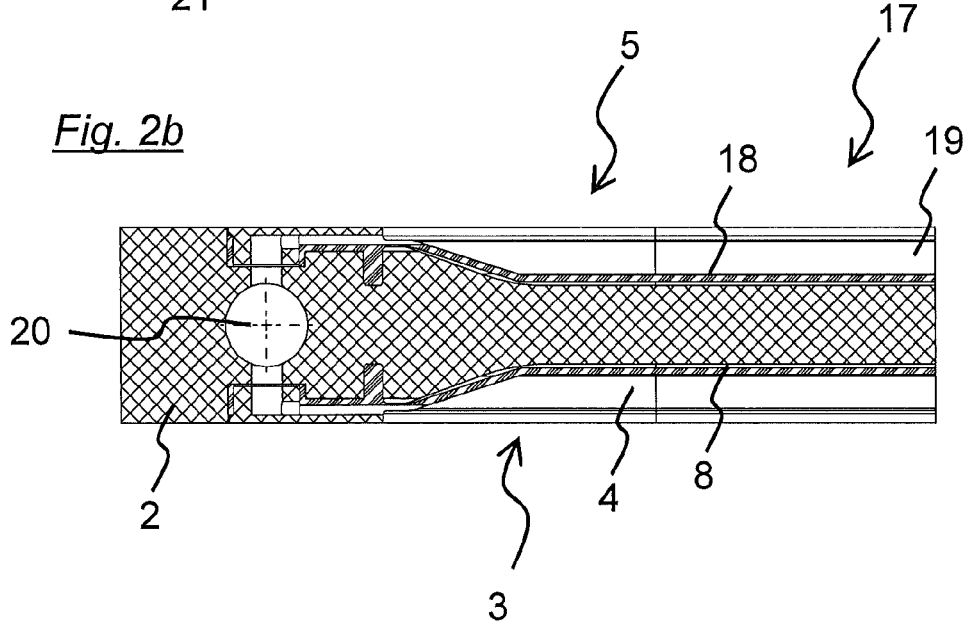
Figure 3A:
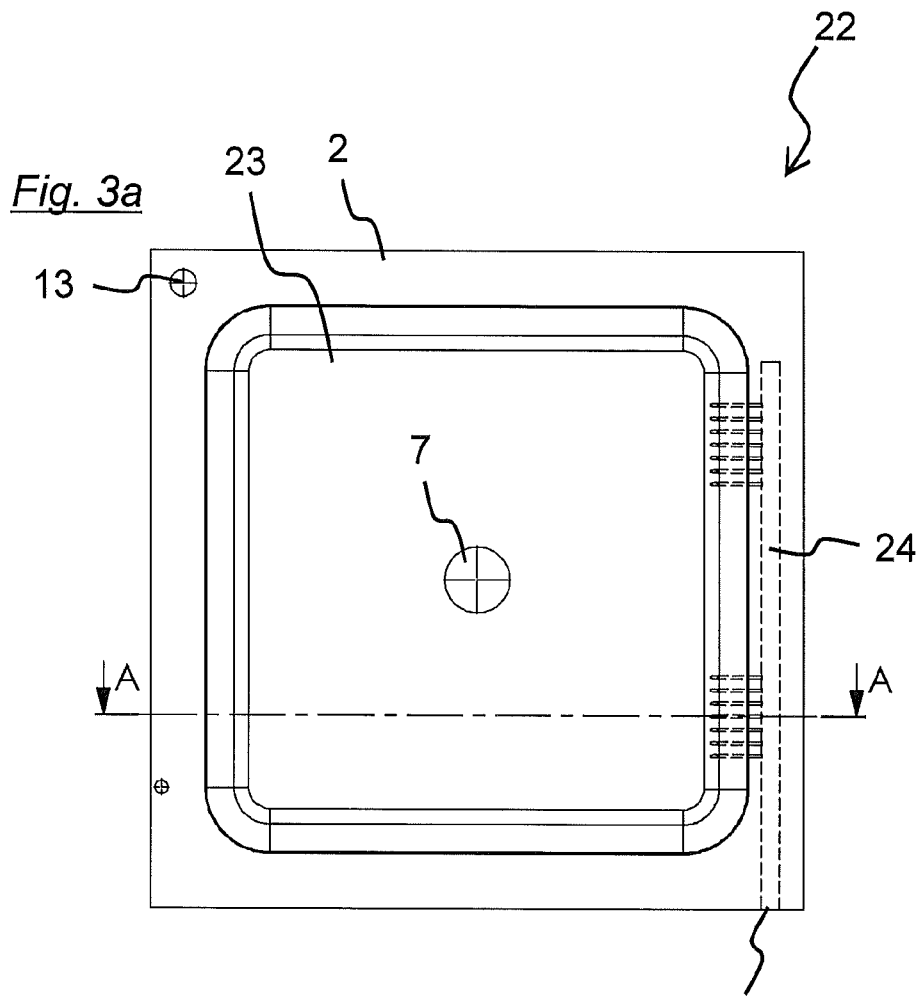
Figure 3B:
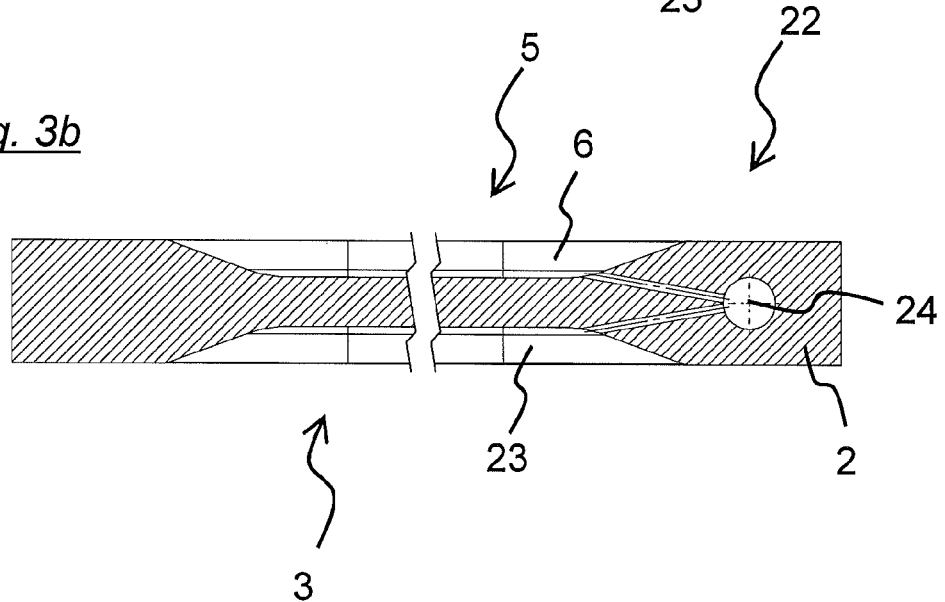

FIG. 1a shows the membrane face of a first recess plate ("combi plate") according to the invention, FIG. 1b shows a cut through this combi recess plate, and FIG. 1c shows a detail of this combi recess plate, FIG. 2a shows one face of a second recess plate ("membrane plate") according to the invention, and FIG. 2b shows a cut through this membrane plate, FIG. 3a shows one face of another recess plate ("chamber plate"), and FIG. 3b shows a cut through this chamber plate.

The first recess plate 1 according to the invention, shown in FIGS. 1a/b is designed for packing a plurality of only specimens of the first recess plate 1 into a pack (so-called "combi pack") between a stationary head piece and a movable end piece of a first filter device, wherein the first filter device has two filter cloths between adjacent specimens of the first recess plate 1 for filtering a solid content out of a suspension as a filter cake. The first filter device, it's head and end pieces, the pack of specimens of the first recess plate 1 and the filter cloths are not shown.

The first recess plate 1 has a base body 2 made of PP, and in a first face 3 of the base body 2 has a first recess 4 and in a second face 5 a second recess 6, wherein in the pack, the first recess 4 and the second recess 6 of adjacent specimens of the first recess plate 1 form a filter chamber. Apart from the first recess 4 and the second recess 6 of the first recess plate 1, the filter chamber is not shown.

The first recess plate 1 has a through-hole 7, wherein in the pack, the through-holes 7 of the specimens of the first recess plate 1 form a suspension pipe for piping the suspension from the head into the filter chambers, and between the respective filter cloths. Apart from the through-hole 7 of the first recess plate 1, the suspension pipe is not shown.

The first recess plate 1 has a movable membrane 8 sealed around the first recess 4, wherein the membrane 8 and the first recess plate 1 enclose a squeezing chamber and the recess plate 1 has an inlet duct for filling a squeezing fluid into the squeezing chamber, for mechanically pressing a remaining fluid out of the filter cake. The squeezing chamber and the inlet duct for the squeezing fluid are not shown.

The first recess plate 1 further has a first duct 9 and a first outlet 10 to the ambience for discharging a liquid fraction of the suspension out of the first recess 4 as a filtrate, and a second duct 11 and a second outlet 12 to the ambience for discharging the filtrate out of the second recess 6. The first duct 9 is connected to a through-hole 13, wherein the through-holes 13 of adjacent specimens of the first recess plate 1 form a supply pipe for piping the drying gas and the washing liquid into the first duct 9. Apart from the through-holes 13 of the first recess plate 1, the supply pipe is not shown.

The first recess plate 1 further has a valve 14, that is in detail shown in FIG. 1c. The valve 14 is a pneumatically driven membrane, namely a pinch valve for opening the first duct 9 to the ambience. The first recess plate 1 further has a control conduit 15 for the valve 14, and a through-hole 16, connected to the control conduit 15, wherein in the first filter device, the through-holes 16 of adjacent specimens of the first recess plate 1 form a control pipe to the head piece. Apart from the through-hole 16 of the first recess plate 1, the control pipe is not shown.

The second recess plate 17 according to the invention, shown in FIGS. 2*a/b* basically resembles the first recess plate 1 as shown in FIGS. 1*a/b*. Basically identical features of the second recess plate 17 are marked according to the first recess plate 1.

Differing from the first recess plate 1, the second recess plate 17 has a second movable membrane 18 sealed around the second recess 19, wherein the second membrane 18 and the second recess plate 17 enclose a second squeezing chamber and the second recess plate 17 has a second inlet duct for inserting a squeezing fluid into the second squeezing chamber. Again, the squeezing chamber and the inlet duct for the squeezing fluid are not shown.

Further differing from the first recess plate 1, in the second recess plate 17 both the first recess 4 and the second recess 19 are connected to a common first duct 20 and first outlet 21 for discharging the filtrate. The second recess plate 17 has no second duct for discharging the filtrate.

The third recess plate 22, shown in FIGS. 3*a/b* again basically resembles the first recess plate 1 as shown in FIGS. 1*a/b*. Basically identical features of the third recess plate 22 are marked according to the first recess plate 1.

Differing from the first recess plate 1, the third recess plate 22 has no movable membrane. Further differing from the first recess plate 1, the third recess plate 22 has no first duct for discharging the filtrate. In the third recess plate 22 both the first recess 23 and the second recess 6 are connected to a common second duct 24 and second outlet 25 for discharging the filtrate. In a second filter device according to the invention, specimens of the second recess plate 17 and specimens of the third recess plate 22 are alternating in the pack (so-called "mixed pack").

The pack of a third filter device according to the invention contains an alternating sequence of the second recess plate 17 and a fourth recess plate, that is similar to the third recess plate 22, but having membranes at either recess (so-called "full membrane pack"). The pack of a fourth filter device according to the invention contains an alternating sequence of a fifth recess plate according to the invention, that is similar to second recess plate 17, but having no membranes, a the third recess plate (so-called "full chamber pack"). The third and fourth filter devices and the fourth and fifth recess plates are not shown.

Operating the first to fourth filter devices in a method according to the invention, first a suspension is piped through the suspension pipe into the filter chambers and between the respective filter cloths. The solid content of the suspension settles between the filter cloths, and the liquid fraction of the suspension permeates the same and discharges out of the filter chambers through the first ducts 9, 20, and through the second ducts 11, 24, as filtrate. The filter device is then disconnected from the suspension supply, and the valves 14 are closed by supplying the control pipe with pressurized air.

Then, in operating the first to third filter devices, the squeezing chambers are charged with a squeezing fluid, namely water, through the inlet ducts. The membranes 8, 18 are forced into the filter chambers by the squeezing fluid, and squeezing the remaining suspension out of the filter cake. The squeezing chambers are disconnected from the squeezing fluid supply and opened for discharging the squeezing fluid.

Then, the filter chambers are supplied with a washing liquid, namely water, through the supply pipe and through the first ducts 9, 20. The washing liquid permeates the filter cloths and the filter cakes inbetween, and discharges through the second ducts 11, 24. At a step change condition, the filter device is disconnected from the washing liquid.

Then again, in operating the first to third filter devices, the squeezing chambers are charged with the squeezing fluid for squeezing the remaining washing liquid out of the filter cake. The squeezing chambers are disconnected from the squeezing fluid supply and opened for discharging the squeezing fluid.

At the same time the filter chambers are supplied with process air through the first ducts 9, 20. The drying gas permeates the filter cloths and the filter cakes inbetween, and discharges through the second ducts 11, 24. At a step change condition, the filter device is disconnected from the drying gas.

Finally, the end plate is released and the filter device and the pack opened for unloading the filter cakes, for cleaning and revising the filter cloths, the membranes 8, 18 and the recess plates 1, 17, 22, in particular the filter chambers, for another filtration cycle.

In the figures
 1 recess plate
 2 base body
 3 face
 4 recess
 5 face
 6 recess
 7 through-hole
 8 membrane
 9 duct
 10 outlet
 11 duct
 12 outlet
 13 through-hole
 14 valve
 15 control conduit
 16 through-hole
 17 recess plate
 18 membrane
 19 recess
 20 duct
 21 outlet
 22 recess plate
 23 recess
 24 duct
 25 outlet

What is claimed is:

1. A first recess plate, designed for packing into a pack between a stationary head piece and a movable end piece of a filter device,
   wherein the first recess plate has a duct connecting a filter chamber between the first recess plate and an adjacent recess plate in the pack, to an ambience of the pack, and a valve for opening the duct to the ambience, characterized in that the valve is a pneumatically driven a membrane, and the valve is nested within the first recess plate,
   wherein the duct has an end, and an outlet at an opposite end of the duct, and
   wherein the first recess plate has a through-hole forming a supply pipe together with a through-hole of the adjacent recess plate, at the end of the duct, opposite to the outlet of the duct, that is closeable by the valve, to the ambience.

2. A first recess plate according to claim 1, further characterized by a control conduit for the valve.

3. A first recess plate according to claim 2, further characterized by a through-hole, connected to the control conduit, wherein in the filter device the through-holes of the specimens of the first recess plate form a control pipe to the head piece.

4. A first recess plate according to claim 1, further characterized in that the valve is a pinch valve.

5. A first recess plate according to claim 1, further characterized by a movable membrane sealed around the filter chamber, wherein the moveable membrane and the recess plates enclose a squeezing chamber and the first recess plate has an inlet duct for filling a squeezing fluid into the squeezing chamber, for mechanically pressing a remaining fluid out of the filter cake.

6. A first recess plate according to claim 1, further characterized by a second movable membrane at a face opposite to the first recess, wherein the second movable membrane is sealed around a second filter chamber, wherein the second movable membrane and the first recess plate enclose a second squeezing chamber and the first recess plate has a second inlet duct for inserting a squeezing fluid into the second squeezing chamber.

7. A filter device, having between a stationary head piece and a movable end piece a pack of at least a first recess plate and a second recess plate, the second recess plate have a second recess, the second recess forming a filter chamber between the first recess plate and the second recess plate, and the filter device having two filter cloths between the first recess plate and the second recess plate for filtering a solid content out of the suspension as a filter cake, and the first recess plate having a first duct towards a first outlet and the second recess plate having a second duct towards a second outlet, characterized by at least the first recess plate according to claim 1.

8. A filter device according to claim 7, further characterized by recess plates and other recess plates alternating in the pack.

9. A filter device, having between a stationary head piece and a movable end piece a pack of at least a first recess plate and a second recess plate, the second recess plate have a second recess, the second recess forming a filter chamber between the first recess plate and the second recess plate, and the filter device having two filter cloths between the first recess plate and the second recess plate for filtering a solid content out of the suspension as a filter cake, and the first recess plate having a first duct towards a first outlet and the second recess plate having a second duct towards a second outlet, characterized by at least the first recess plate according to claim 1.

10. A filter device according to claim 9, further characterized by recess plates and other recess plates alternating in the pack.

11. A filter device, having between a stationary head piece and a movable end piece a pack of at least a first recess plate and a second recess plate, the first recess plate have a first recess and the second recess plate have a second recess, the first recess and the second recess forming a filter chamber between the first recess plate and the second recess plate, and the filter device having two filter cloths between the first recess plate and the second recess plate for filtering a solid content out of the suspension as a filter cake, and the first recess plate having a first duct towards a first outlet and the second recess plate having a second duct towards a second outlet, characterized by at least the first recess plate according to claim 1.

12. A filter device according to claim 11, further characterized by recess plates and other recess plates alternating in the pack.

13. A first recess plate according to claim 1, further characterized by a recess forming the filter chamber.

14. A first recess plate according to claim 1, wherein the first recess plate differs from the adjacent recess plate.

* * * * *